United States Patent [19]
Zulawski

[11] Patent Number: 5,033,572
[45] Date of Patent: Jul. 23, 1991

[54] DRIVE SYSTEM FOR A SNOWMOBILE

[75] Inventor: Dennis P. Zulawski, St. Hilaire, Minn.

[73] Assignee: Arctco, Inc., Thief River Falls, Minn.

[21] Appl. No.: 491,990

[22] Filed: Mar. 12, 1990

[51] Int. Cl.⁵ .......................................... B62M 27/02
[52] U.S. Cl. ................... 180/190; 180/182; 280/22.1
[58] Field of Search ................ 280/21.1, 22.1; 180/182, 190

[56] References Cited

U.S. PATENT DOCUMENTS

| | | | |
|---|---|---|---|
| 3,213,955 | 10/1965 | Hetteen | 180/190 |
| 3,883,152 | 5/1975 | de Carbon | 280/666 |
| 3,884,314 | 5/1975 | Callaway | 180/182 |
| 4,442,913 | 4/1984 | Grinde | 180/190 |
| 4,848,503 | 7/1989 | Yasui et al. | 180/190 |

Primary Examiner—Charles A. Marmor
Assistant Examiner—Mitchell Bompey
Attorney, Agent, or Firm—Jerold M. Forsberg; James E. Olds

[57] ABSTRACT

A suspension/traction unit for a snowmobile is disclosed as having an area of primary support and a two stage angle of attack. The traction unit includes a drive sprocket rotatably mounted to the snowmobile chassis a predetermined height above ground level when the snowmobile is at rest. An endless belt is guided by slide rails such that a low primary angle of attack of about 6 degrees is presented as well as a secondary angle of attack steeper than the primary angle attack making it possible for the snowmobile to effectively start and move in deep snow.

4 Claims, 2 Drawing Sheets

DRIVE SYSTEM FOR A SNOWMOBILE

BACKGROUND OF THE INVENTION

The present invention relates generally to an improved drive system for a snowmobile, and more specifically to a snowmobile having a suspension/traction unit designed to have a two stage angle of attack with a low primary angle of attack. The traction unit is suspended relative to the chassis of the snowmobile and includes a secondary angle of attack for accelerating in deep snow and a primary angle of attack for high speed travel and starting out on surfaces where the snow is less deep or is compacted.

Snowmobiles have typically had a variety of arrangements for controlling the endless belt of the powered traction units. The typical prior art traction units are single stage angle of attack. Accordingly, there has been a problem with prior art snowmobiles in that the angle of attack is either of a type which is better suited for racing or of a type that is better suited for trail riding. The attributes of each are that an angle of attack used for trail riding is a compromise between an angle better suited for deep snow and an angle better suited for riding where the snow is compacted and that a low angle of attack is more efficient on compacted snow. A snowmobile with the suspension/traction unit arranged and set up for racing generally has a very low angle of attack and limited travel in order to provide a very positive feel for the driver and to coordinate the suspension for the traction unit to the suspension for the front skis.

The prior art has not provided a snowmobile with a suspension/traction unit which has an angle of attack that is responsive and efficient in deep snow and is effective for high speed riding.

SUMMARY OF THE INVENTION

The present invention is part of an overall inventive suspension which is further described in my two co-pending applications Ser. Nos. 491,515 and 491,990, which were filed on the same date as this application. One of the copending applications is directed to an improved snowmobile spindle arrangement while the other is directed to a front suspension for a snowmobile.

In accordance with the present invention, an improved suspension/traction unit arrangement is provided for a snowmobile which results in a snowmobile with a more positive and comfortable ride and which has a two stage angle of attack built in to the suspension/traction unit.

The present inventive arrangement for a suspension/traction unit was arrived at by many hours of testing and the willingness to keep changing the suspension/traction unit until the final desired result was attained. The balance of the attack angle to the amount of suspension travel available was the first order of business during research. The second factor involved was the reduction in the amount of track which the traction unit would employ.

It was finally settled that the optimum angle of attack for the traction unit is about 6 degrees with the front drive sprocket for the endless belt of the traction unit being about 5 inches above ground level when the snowmobile is at rest. The decision to use a primary attack angle of 6 degrees resulted in the two stage angle of attack because of the need for a higher angle of attack for helping the snowmobile get started and move in deep snow. A significant benefit of the overall suspension/traction unit is the total amount of travel of the unit relative to tunnel in the chassis while having a relatively low angle of attack. The adjustment of the length of the suspension/traction unit and the positioning of the suspension/traction unit relative to the tunnel of the chassis along with the positioning of the front skis relative to the center of gravity of the snowmobile results in a balance under power which has heretofore not been found in snowmobiles.

Accordingly, it is an object of the present invention is to provide a suspension/traction unit for a snowmobile which has better control and at the same time provides a comfortable and more stable ride.

Yet another object of the invention is to provide a suspension/traction unit which has a two stage angle of attack combined with an area of primary support.

Other objects and advantages of the present invention will be apparent and understood from the following detailed description when taken in conjunction with the accompanying.

BRIEF DESCRIPTION OF THE DRAWINGS

An improved suspension/traction unit for a snowmobile constructed in accordance with this invention is described hereinbelow with reference to the accompanying drawing, wherein.

DETAILED DESCRIPTION OF THE INVENTION

Figure 1:
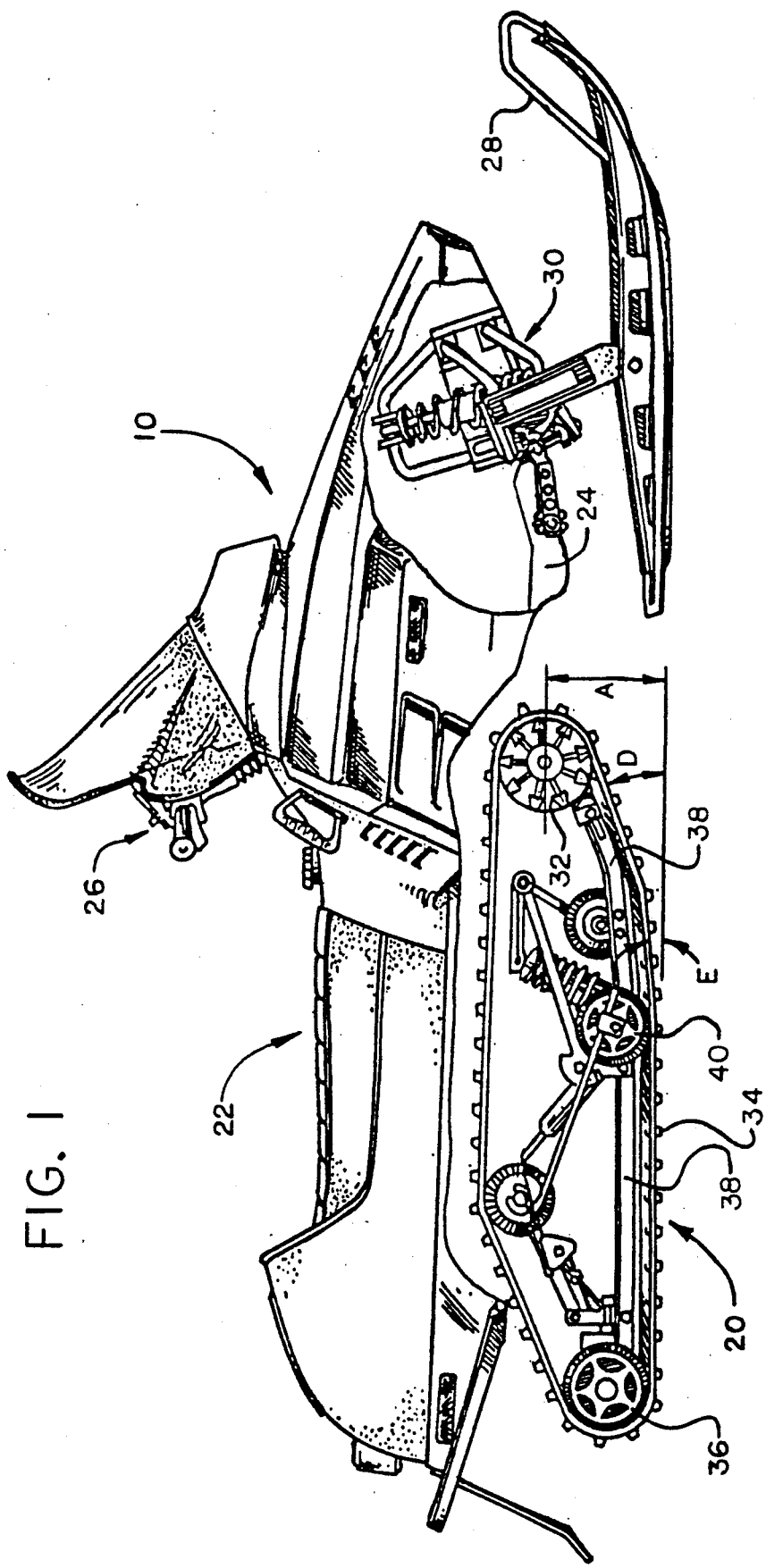
FIG. 1 is a side view of a snowmobile with portions broken away showing arrangement of the front suspension and the rear suspension/traction unit.
Figure 2:
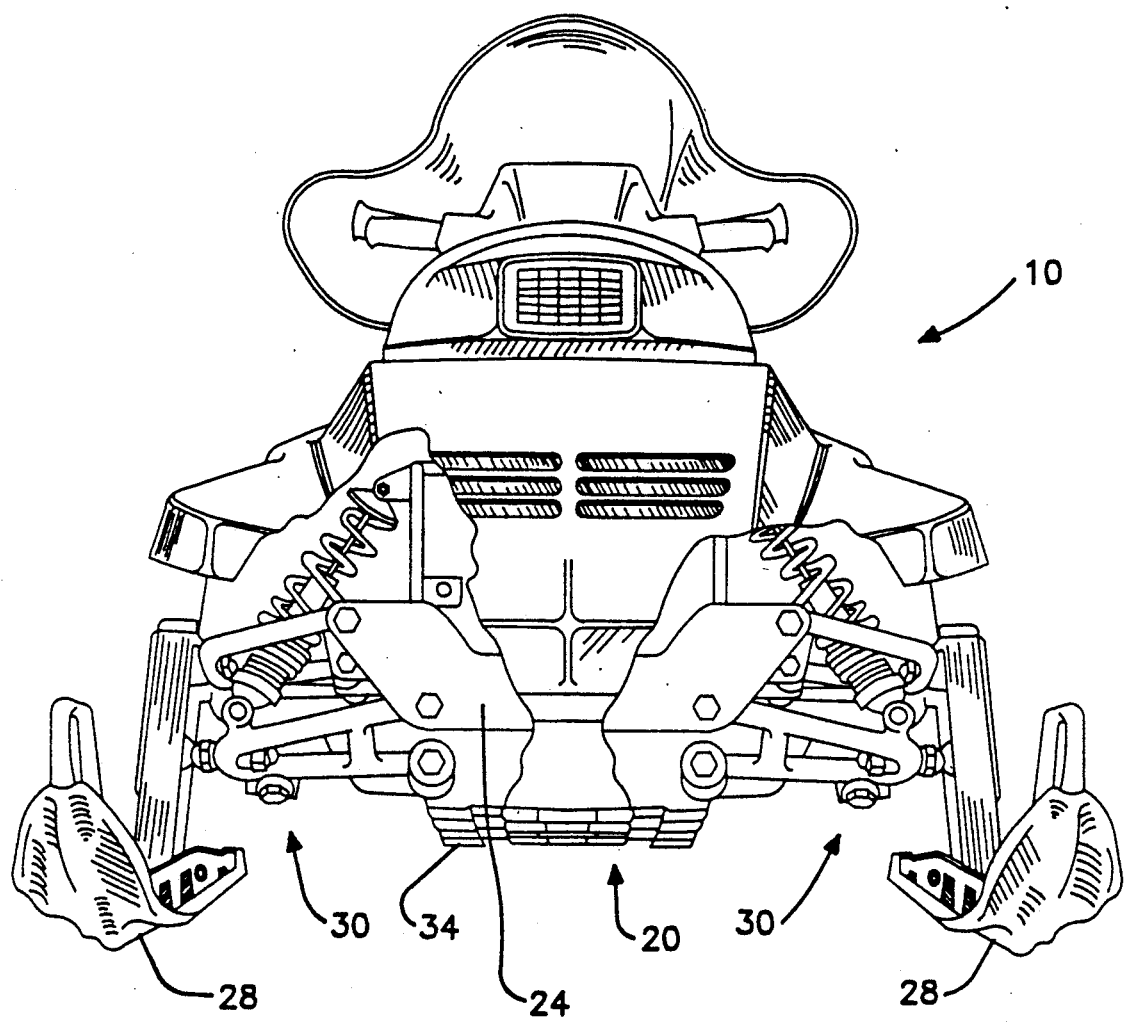
FIG. 2 is front view of the snowmobile as seen in FIG. 1 with portions of the hood broken away to better illustrate the front suspension relative to the rear suspension/traction unit.

It should be noted that like reference numerals are used throughout the various views to designate the same or similar elements or components.

Referring now to FIG. 1, a snowmobile 10, of the type having a forwardly mounted engine (not shown) is depicted as having a suspension/traction unit 20, a seat area 22, a chassis 24, a steering arrangement 26, a pair of skis 28, and a front suspension 30 for attachement and support of the snowmobile chassis 24 relative to skis 28. For purposes of this application discussion will be limited to the new and inventive traction portion of the suspension/traction unit 20.

Traction unit 20 is of the endless belt type and includes a front drive sprocket 32, an endless belt 34, and rear idler wheels 36 (only one of which is shown). Front drive sprocket 32 and idler wheels 36, with the endless belt tensioned therearound, define the forward and rearward ends of the traction unit, respectively. Slide rails 38 (only one of which is shown) extend between drive sprocket 32 and idler wheels 36 and guides the endless belt 34 as it moves from sprocket 32 to idler wheels 36. Slide rails 38 include a first bend of generally 6 degrees in the vicinity of idler wheels 40 and a second bend between idler wheels 40 and sprocket 32. Endless belt 34 provides an area of primary support between rear idler wheels 36 and idler wheels 40. Drive sprocket 32 is rotatably attached to the snowmobile chassis 24 at a predetermined height above ground level with the snowmobile at rest that distance is indicated as distance "A". This distance will vary depending upon the size of the front drive sprocket and it has been found that for the bottom of the drive sprocket to be generally about 5 inches above ground level, with the snowmobile at rest, is optimum. The first bend in the slide rail, i.e., angle "E", which is preferably about 6 degrees, is a constant and is the primary angle of attack for the traction unit. The second bend in slide rail 38 establishes a secondary angle of attack, i.e., angle "D", steep enough to help the snowmobile start out and run in deep snow. It has been found that this two stage angle of attack is of substantial benefit because the snowmobile goes through the stages of starting out in deep snow and then running at slow speed to operating at a crusing speeds. As the snowmobile gains speed in deep snow it will begin planing much like a boat on water.

It should be understood that other forms of the invention are contemplated and that numerous modifications may be made by those of skill in the art without departing from the scope and spirit of the invention as defined by the following claims.

I claim:

1. A traction unit for a snowmobile having an area of primary support and a two stage angle of attack, the traction unit comprising an endless belt driven by a powered drive sprocket rotatably mounted relative to a chassis of the snowmobile at a predetermined height above ground level, said drive sprocket engaging the endless belt and establishing a forward end of the traction unit, wheel means engaging the endless belt and establishing a rearward end of the traction unit, and slide rail means engaging an inner side of the endless belt disposed between the drive sprocket and the wheel means for guiding the endless belt, said slide rail means including a first portion guiding said endless belt so as to present an area of primary support, a second portion angled relative to said first portion guiding said endless belt so as to present a primary angle of attack, and a third portion angled relative to said second portion guiding said endless belt so as to present a secondary angle of attack.

2. A traction unit as set forth in claim 1 wherein said second portion of said slide rail means is angled 6 degrees relative to said first portion.

3. A traction unit as set forth in claim 1 wherein said drive sprocket is mounted such that a bottom end of the sprocket is generally 5 inches above ground level when the snowmobile is at rest.

4. A traction unit as set forth in claim 3 wherein said secondary angle of attack is a relatively steep angle making it possible for the snowmobile to start and move in deep snow.

* * * * *